United States Patent [19]
Davidescu et al.

[11] Patent Number: 4,671,964
[45] Date of Patent: Jun. 9, 1987

[54] UPGRADING OF LOW QUALITY GREEN COFFEE

[75] Inventors: Reghina Davidescu, Princeton Junction; Randy F. Striebel, Mount Holly, both of N.J.; Roger E. Hawks, St. Augustine, Fla.

[73] Assignee: General Foods Corp., White Plains, N.Y.

[21] Appl. No.: 822,189

[22] Filed: Jan. 24, 1986

[51] Int. Cl.$^4$ .............................................. A23F 5/02
[52] U.S. Cl. ..................................... 426/461; 426/466
[58] Field of Search ................................ 426/461, 466

[56] References Cited

U.S. PATENT DOCUMENTS

| | | | |
|---|---|---|---|
| 2,278,472 | 4/1942 | Musher | 426/445 X |
| 3,767,418 | 10/1973 | Ponzoni et al. | 426/461 |
| 3,991,223 | 11/1976 | Baron et al. | 426/594 |
| 4,540,591 | 9/1985 | Dar et al. | 426/388 |

Primary Examiner—Joseph Golian
Attorney, Agent, or Firm—Barbara Toop D'Avanzo; Joseph T. Harcarik; Daniel J. Donovan

[57] ABSTRACT

A method for use upgrading green coffee beans which comprises an initial steam treatment, a moisturization of the coffee, and an additional steam treatment. The method provides for a more efficient and improved upgrading of the beans. The method also results in a more rapid hydration of the beans during the moisturization step.

6 Claims, 1 Drawing Figure

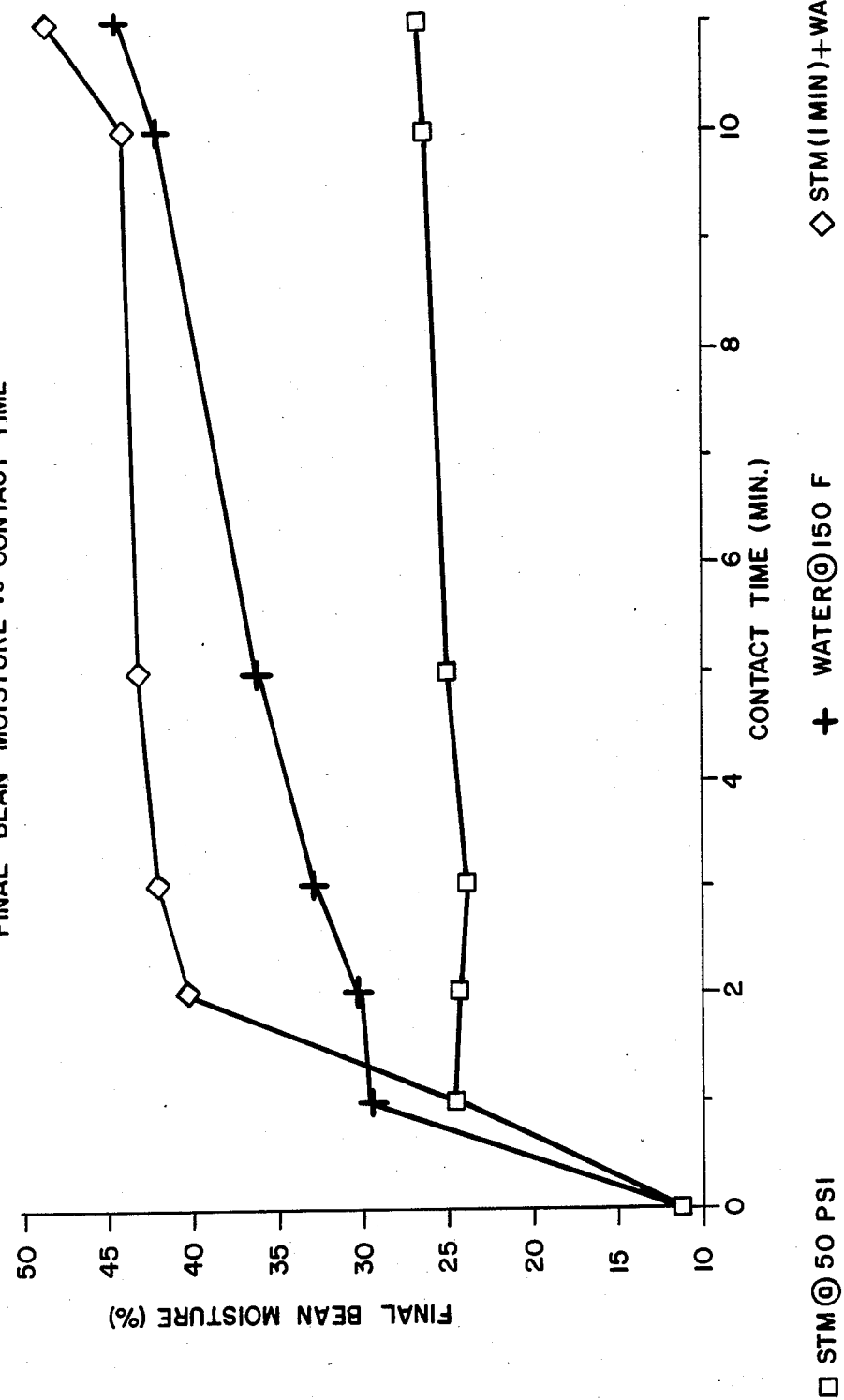

UPGRADING OF LOW QUALITY GREEN COFFEE

TECHNICAL FIELD

The present invention relates to a method for upgrading the quality of green coffee beans, in particular green coffee beans having a high level of undesirable flavor and aroma components. More specifically, the invention relates to a method for flavor upgrading wherein green coffee beans are treated with steam, moisturized, and then steam treated a second time.

BACKGROUND OF THE INVENTION

Coffee manufacturers have advanced many processes aimed at upgrading the flavor quality of relatively poor quality green coffee beans over the years. One such process is taught by Ponzoni et al. in U.S. Pat. No. 3,767,418. Ponzoni et al. teach a method wherein green coffee is moisturized with water at a weight ratio of 0.25 to 1.5 green coffee to water. The moisturized green coffee is then steam-treated in an enclosed pressure vessel at a pressure of about 50 to 140 psig for from 1 to 10 minutes. The coffee so treated, after roasting, was found to be superior to a non-treated control. According to the Ponzoni et al. teaching, "below a steam pressure of about 50 p.s.i., the upgrading effect of treatment is insufficient to produce the desired characteristics in the final roasted and brewed coffee beverage" and "[a] steam pressure of 90 p.s.i. for treating the wetted green coffee has been found most desirable and a preferred operating range is from 70–110 psi steam pressure."

Another prior art process is described in U.S. Pat. No. 2,278,473 to Musher which teaches treatment of green or roasted coffee beans at a moisture level below about 20 to 25% by weight.

U.S. Pat. No. 4,540,591 to Dar et al. teaches a method for treating Robusta coffee beans wherein the beans are steam treated at a pressure of 7 to 10 atmospheres in a pressure vessel for 10 to 15 minutes with a continuous vent, discharged and then roasted. U.S. Pat. No. 3,991,223 to Baron et al. teaches a method for modifying the flavor and aroma of a steamed coffee aroma.

It is an object of the present invention to identify an efficient method for upgrading the quality of poor quality beans.

It is a further object to upgrade the quality of poor quality beans with a minimal level of energy consumption.

These and other objects of the invention will become apparent as the invention is described in detail below.

SUMMARY OF THE INVENTION

It has been found that the flavor and aroma quality of poor quality green coffee beans is efficiently upgraded by treating green coffee beans with steam, moisturizing the steam-treated beans, and then steam treating the moisturized beans for a second time. According to the invention, the initial steam treatment preheats the beans, thus allowing the beans to hydrate very rapidly when contacted with moisture at a temperature of about 240° F. to about 310° F. and, as a result of the combination of these initial treatments, the final steam treatment effectively upgrades the green coffee beans at a pressure of about 20 to 70 psig.

DETAILED DESCRIPTION OF THE INVENTION

Certain green coffee beans are typically characterized as low quality or low-grade green coffees. These coffees are generally characterized as having a very strong, tarry, moldy and/or earthy flavor by an expert panel. Robusta coffees represent one example of a green coffee which is characterized as being of low quality.

The present invention provides a method for upgrading green coffee of a low quality which comprises an initial steam treatment. The steam used in this initial steam treatment is typically at a pressure of about 20 psig to about 70 psig and a temperature of about 258° F. to about 316° F. The duration of the initial steam treatment is generally from about 0.5 minutes to about 3 minutes. Said steam treatment may be conducted in a closed system or, preferably, in a system which is vented to the atmosphere, and said steaming may be accomplished in a batch, semi-batch or continuous manner.

The initial steam treatment does not accomplish an upgrading of the low quality beans. Rather, it has been found that the initial steam treatment is critical to upgrading the beans only in conjunction with the following two steps, namely moisturization and a second steaming step. The initial steam treatment serves to heat the green beans. The moisture of the green beans may also be raised to some degree, as for example to a moisture level of about 20% to about 25% by weight.

Following the initial steam treatment, the treated green beans are moisturized, generally to a moisture level of about 35% to about 45% by weight. The treated beans may be moisturized by contact with preheated water or with an aqueous stream that has previously been in contact with green coffee beans, typically for a period of about 0.5 minutes to about 2 minutes. In one embodiment of the invention, water is placed in a vessel and treated green beans are added thereto. After the treated green beans have been moisturized to their desired moisture level, the moisturized beans are removed therefrom. Preheated water is then added to the vessel to make-up for the amount of liquid removed from the vessel as part of the moisturized beans, and a new load of treated green beans are then added. Thus, in this embodiment, after the initial treated green beans are moisturized in the vessel, subsequent green coffee loads charged to the vessel are contacted with an aqueous stream that has previously been in contact with green coffee beans and thereby has a certain level of green coffee solids. This aqueous stream may be termed a green coffee extract.

The liquid stream used to moisturize the treated coffee beans is preheated, typically to a temperature of about 240° F. to about 310° F. Said liquid stream treatment serves not only to moisturize the beans, but also to increase the inner green bean temperature to a temperature approaching that of the preheated liquid stream.

The moisturized beans are then steam treated for a second time. The second steam treatment is typically conducted at a steam pressure of about 20 psig to about 70 psig, preferably at a steam pressure of about 30 psig to about 60 psig. It has been found that steam pressures above 70 psig are unnecessary and, in fact, result in the generation of negative flavor notes according to the present invention. Said second steam treatment may be accomplished either in a batch, semi-batch, or continuous manner. The duration of the second steaming step is about 0.5 minutes to about 4 minutes, and preferably about 1 minute to about 3 minutes.

The green coffee beans treated according to the present invention are significantly upgraded by the method of the present invention. In a controlled comparison of said upgraded beans, after roasting and brewing, the upgraded beans are described by an expert panel as being much cleaner, less harsh, less dirty with only a slight earthy flavor.

After the total treatment of the invention, it is possible to convey the upgraded wet beans to conventional roasting equipment and to roast the beans to the desired roast color. In the alternative, the upgraded beans may be dried, as for example by air drying, to a lower moisture, for example about 11% to about 15% by weight. Drying of the beans subsequent to the method of the present invention and prior to roasting provides the advantage of improved stability should it be necessary to store the upgraded beans for a period of time.

The advantages of the invention are thus readily apparent. The invention enables upgrading of poor quality beans through the use of steam at a lower pressure than was heretofore achievable. That is to say that poor quality beans may be upgraded with the use of steam at a pressure of 20 to 50 psig whereas, according to prior art systems such as Ponzoni et al., a pressure of about 90 psig was required to achieve a comparable upgrading. Thus, a saving is accomplished in terms of lower energy requirements and the materials of construction for the pressure vessel employed need only be required to withstand a lower pressure during the upgrading process. Further, the upgraded beans of the present invention have been found to be preferred over prior art upgraded beans by an expert panel. In addition, it has been found that the initial steam treatment results in a more rapid rate of hydration than control green beans that are not initially steam treated. As such, a more efficient hydration of the green beans is accomplished according to the present invention.

In a preferred embodiment of the invention, the steps of the present invention are accomplished in a single vessel. One vessel which is particularly suitable for such an application is a digester, such as a Bauer No. 459 M&D Digester, manufactured by C-E Bauer, a subsidiary of Combustion Engineering, Inc., Springfield, Ohio. Traveling compartments formed by conveyor flights transport the product within the digester. The digester is a cylindrical vessel closed at each end and installed at a 45° angle. The tank is divided along its axis into two segments by a conveying belt. The belt terminates before reaching each end of the cylinder. According to the preferred embodiment, a reservoir of "green extract" is maintained at the lower end of the digester. Untreated green coffee beans are introduced to the digester such that they fall onto the conveying belt where they are confined between constantly moving flights of the conveyor. The flights carry the coffee down the top side of the conveying belt, into and through the green extract reservoir, and then, on the underside of the conveying belt, the beans are transported up the vessel to a discharge at the elevated end of the digester. Saturated steam is introduced to the digester above the level of the green extract reservoir, thereby serving to steam-treat the green coffee prior to the moisturization in the reservoir and upgrade the beans after they are moisturized. There is also provided an inlet such that make-up preheated water may be added to the green extract reservoir at or near the liquid level so as to maintain its level.

Having thus described the invention, the following examples serve to further illustrate the process of the invention.

EXAMPLE I

Green coffee beans (EK-20/25) are fed to a Bauer Digester as previously described. Saturated steam is fed to the digester above a green extract level which is maintained at the bottom of the digester to about 10% of the digester height. The saturated steam is fed at a pressure of 50 psig and a temperature of 298° F. The green beans are thus steam treated for a period of about 2.25 minutes as they move within the flights along the top side of the conveying belt. The green beans then enter the green extract reservoir which is maintained at a temperature of about 285° F. The beans pass through the reservoir and are thereby moisturized to about 40% by weight moisture. The total residence time within the reservoir is about 0.5 minutes. The beans are then conveyed within the flights up the bottom side of the belt and steam treated by saturated steam at a pressure of 50 psig and a temperature of 298° F. The moisturized beans are contacted by the steam for a period of about 2.25 minutes, prior to exiting the digester.

The green beans thus treated are roasted and a brew is prepared. A control brew is prepared from identical green beans which are untreated. An expert panel judged the treated beans to be significantly cleaner, less harsh, less dirty and with only a slight earthy flavor, as compared to the control which was tarry, dirty, and earthy.

EXAMPLE II

The rate of moisturization of Ivory Coast green coffee beans was compared. A first set of beans were first steam treated according to the present invention whereas control beans were not steam treated prior to being contacted with water. As shown in FIG. I, Ivory Coast beans that were steam treated with saturated steam at a pressure of 50 psig for 1 minute and then contacted with preheated water at a temperature of 150° F. reached a moisture level of 40% in 2 total minutes, i.e., 1 minute of steam treatment and 1 minute of water contact. Control Ivory Coast beans that were not steam treated, but rather contacted with water at 150° F. took about 10 minutes to reach the same 40% moisture level. Thus, a five-fold increase in the rate of moisturization is accomplished by the present invention.

EXAMPLE III

A comparison of upgraded EK-20/25 coffee beans was made for the process of the present invention versus the process described in U.S. Pat. No. 3,767,418 to Ponzoni et al. The Ponzoni et al. sample was prepared according to Example I of the '418 reference: beans were placed in an autoclave with water at a 1:1 ratio by weight, steam was used to increase the pressure to 90 psig and the system was maintained at the elevated pressure for about 5 minutes.

Two samples were prepared according to the present invention, the only difference being the pressures at which the steam treatment steps were conducted. The first sample was prepared by steam treating the green beans for 2.25 minutes at 30 psig, then contacting the beans with water at a temperature of about 272° F. for 0.5 minutes, and finally steam treating the moisturized beans for 2.25 minutes with steam at 30 psig. The second sample was made according to the same process except that both steam treatments were at 50 psig.

All three green bean samples were then roasted to a 70 roast color and brews were prepared at a recipe level of 90 cups/pound. An expert panel compared the three samples and found the two samples prepared according to the present invention, i.e., the sample upgraded at 30 psig and the sample upgraded at 50 psig, to be significally cleaner and less harsh than the identical beans upgraded according to the Ponzoni et al. process.

We claim:

1. A method for upgrading low quality green coffee comprising:
   (a) contacting green coffee with steam at a pressure of about 20 psig to about 70 psig, a temperature of about 258° F. to about 316° F., for a period of about 0.5 minutes to about 3 minutes;
   (b) contacting said steam-treated green coffee with moisture for a period of about 0.5 minutes to about 2 minutes,
   (c) contacting said moisturized green coffee with steam at a pressure of about 20 psig to about 70 psig, a temperature of about 258° F. to about 316° F., for a period of about 0.5 minutes to about 4 minutes; and
   (d) roasting said coffee.

2. The method of claim 1 wherein the steam pressure of step (a) is the same as the steam pressure of step, (c).

3. The method of claim 1 wherein the moisture of step (b) is at a temperature of about 240° F. to about 310° F.

4. The method of claim 1 wherein the steam pressures of steps (a) and (c) are about 30 psig to about 50 psig and the temperatures are about 274° F. to about 298° F.

5. The method of claim 1 wherein the contacted green beans of step (c) are dried prior to the roasting of step (d).

6. The method of claim 5 wherein the beans are dried to a moisture of about 10% to about 15% by weight.

* * * * *